United States Patent [19]

Burnworth

[11] 4,317,177
[45] Feb. 23, 1982

[54] POWER PRIORITY CONTROL SYSTEM FOR AIRCRAFT AND TEST APPARATUS THEREFOR

[75] Inventor: Donald O. Burnworth, Arvada, Colo.

[73] Assignee: Martin P. Miller, Littleton, Colo.; a part interest

[21] Appl. No.: 111,603

[22] Filed: Jan. 14, 1980

[51] Int. Cl.$^3$ .............................................. G08B 21/00
[52] U.S. Cl. .................... 364/483; 244/194; 340/27 R
[58] Field of Search ............... 364/480, 483; 244/194; 307/38, 39, 116, 126; 340/27 R, 52 R, 52 F, 654

[56] References Cited

U.S. PATENT DOCUMENTS 4,106,013 8/1978 Cronin .............................. 340/27 R
4,127,847 11/1978 Stifter ................................. 340/654

Primary Examiner—Charles E. Atkinson
Assistant Examiner—Gary Chin
Attorney, Agent, or Firm—Crandell & Polumbus

[57] ABSTRACT

A control system prevents electrical overloads in an aircraft of the type in which electrical loads are automatically connected to an electrical supply bus when the wing flaps are extended. The control system determines the maximum capability of the electrical generators for generating electricity and determines the wing flap position. Because electrical load is related to the wing flap position in this type of aircraft, the control system automatically correlates the wing flap position to electrical load. The control system operatively disconnects electrical load from the supply bus, or prevents energization of additional electrical load, when it determines that the maximum power generating capacity of the operative electrical generators will be exceeded by the automatic connection of the electrical load upon extension of the wing flaps.

A test circuit apparatus is used for checking proper operation of the control system. The test circuit apparatus selectively supplies test input signals respresentative of different power generating capabilities and of different wing flap positions. Signals are supplied to indicate operation of the control system in response to the test input signals.

22 Claims, 2 Drawing Figures

FIG. 2

POWER PRIORITY CONTROL SYSTEM FOR AIRCRAFT AND TEST APPARATUS THEREFOR

BACKGROUND OF THE INVENTION

This invention relates to a system for controlling the amount of electrical load connected to an electrical supply bus in an aircraft. More particularly, the invention relates to a system by which certain predetermined electrical loads are automatically disconnected from the aircraft supply bus, in relation to the maximum safe power supplying capacity of the electrical generators supplying the supply bus. The invention is particularly useful in and applicable to an aircraft of the type having a plurality of electrical power generators separately supplying electrical power to the supply bus and an automatic switching arrangement for automatically connecting one or more electrical load devices to the supply bus upon the movement of a wing flap or slat or other control surface of the aircraft from a retracted position to an extended position.

In the type of aircraft to which this invention is directly applicable, which comprises a significant portion of the commercial passenger-carrying aircraft throughout the world, two electrical fans known as pack fans are automatically connected to the supply bus and are energized when the wing flaps are extended. The pack fans aid in cooling the two passenger compartment air-conditioning, heating and pressurizing units which are known as pack units. The two pack units are pneumatically driven by heated and compressed air supplied from the compressor section of the three jet propulsion engines of the aircraft. When the pack units operate considerable heat is generated. The heat must be removed to prevent destruction of the pack unit and assure continued proper operation.

To remove the heat generated by the pack units air is ducted from the outside of the aircraft over the pack units. Under normal high-speed, high-altitude operating conditions the pack units are cooled by air forced through the duct and over the pack units by movement of the aircraft through the air. At aircraft speeds above 200 knots sufficient natural air flow is available to adequately cool the pack units. However, when the speed falls below 200 knots it is desirable to supplement the natural air flow by activating the pack fans which supplement the air flow over the pack units. The normal conditions under which the speed of the aircraft falls below 200 knots are low-altitude, slow-speed operating conditions, such as take-offs and landings and when the aircraft is parked. Under relatively high-speed normal flying conditions the pack fans are not needed and are deactivated.

In aircraft of the type described, an automatic switching system automatically energizes the pack fans when the wing flaps are extended. The pack fans are energized by connecting them to the aircraft electrical supply bus. The position of the wing flaps was selected as the determining factor for automatically energizing the pack fans because the wing flaps must normally be extended to sustain relatively slow flight speed, and slow flight speed is the condition where the pack fans are needed. By automatically energizing the pack fans in relation to the wing flap position, the pilots and flight engineers are relieved of responsibility of manually operating the pack fans during take-offs and landings, the most critical time of flight when many other matters must be controlled and supervised. This automatic system of energizing the pack fans in relation to the wing flap position, has, however, created serious problems and safety hazards, some of which have actually resulted in loss of life and aircraft.

The pack fans are the major electrical load in the aircraft. The pack fan electrical load is significantly greater than that electrical load created by the aircraft lights, safety and navigation equipment and instruments, radios, motors and other operational devices. The electrical load in this type of aircraft is supplied by three electrical generators, each of which is separately driven by one of the three jet propulsion engines of the aircraft. Under normal operating conditions, three properly operating electrical generators will supply sufficient power to energize the whole aircraft electrical system including the two pack fans. Potential overload problems result, however, when less than all three generators are operating.

Currently existing and authorized operations procedures sanctioned by the aircraft manufacturer, most air carriers, and the governmental agency charged with overseeing operation of passenger aircraft in the United States, allow operation of this type of aircraft when two of the three electrical generators are functioning. These authorized operating procedures explicitly require, however, that one of the two pack units including its pack fan must be manually disconnected from the electrical supply bus and rendered inoperable when the flaps are extended to assure safe operating conditions. Operating both pack fans and pack units from only two generators usually overstresses the two operating generators and causes them to trip off from an overloaded or overstressed condition. Of course, as each of the generators drops out or trips off, the magnitude of the overload becomes even greater for each remaining generator. The remaining generators will quickly trip off unless the overload condition is reduced or eliminated. For example, if an additional one of the last two functioning generators becomes inoperative, the last functioning pack unit and pack fan must be completely disconnected from the system to avoid an overload. If the last remaining pack fan is not disconnected, the last generator will become overstressed and will trip off, thus terminating the supply of electrical energy from the three generators driven by the jet propulsion engines. So long as the pack fans are manually disconnected in relation to the number of functioning generators, safe operation of the aircraft is possible. However once all pack units have been disabled, the passenger compartment is without pressurization, heating or cooling, which itself is an emergency condition.

In-flight problems can occur very quickly and require very rapid human response in order to avoid disaster. Generators and their control circuits have been known to malfunction. Jet propulsion engine problems, such as fire, flame-out or foreign object ingestion, also result in loss of a generator because stopping operation of the engine also terminates operation of the generator driven by that engine. Safety devices will automatically disconnect any malfunctioning of nonfunctioning generator from the electrical bus. The flight engineer must respond quickly to any of these inflight problems and disconnect certain electrical loads by noticing the problem, perceiving that the number of functioning generators has been reduced, and manually disconnecting some of the nonessential electrical load in order to avoid an electrical overload. It is not uncommon that the flight engineer is required to perform these activities under the stress of emergency conditions not principally related to electrical problems, such as occur from engine problems. The flight engineer may thus be required to be performing other safety precaution measures at the same time as reducing the electrical load on the aircraft.

It is possible that all jet propulsion engine driven generators may be lost or might trip off under certain circumstances. The type of aircraft described does have a battery system designed to supply sufficient electrical power for the emergency systems of the aircraft under conditions of loss of all three generators. The flight engineer must, however, manually condition the electrical system so that the battery system will become operative under these conditions. Failure to properly condition the electrical system or a failure of the battery system itself, can result in a total loss of electrical power within the aircraft.

The potentially-dangerous electrical overloading problem in this type of aircraft is present because the automatic switching arrangement automatically connects both pack fans to the electrical supply, but requires human intervention to disconnect additional load when an overload problem occurs. Additionally, the electrical overload problems are most apt to occur at times when flight of the aircraft is in its most critical stages—take-offs and landings. Electrical problems can adversely affect the control over the flight of the aircraft, and loss of control, even momentarily during take-off and landing, can be and has proved to be disastrous.

An example of an actually documented situation illustrates the significance of the problem to which the present invention relates. A major United States air carrier was operating an aircraft of the type of which this invention relates with only two of its three generators functioning, as allowed by authorized operating procedures. Because only two of the three generators were functioning, the flight engineer had manually disconnected one of the two pack fans and pack units prior to take-off of the aircraft. The flight began at night under conditions of low cloud cover and rain, thus requiring instrument take-off and flight. The flight originated at a coastal city airport, and the take-off path followed a course over the ocean. Within two minutes after leaving the ground and before an altitude of 3,000 feet had been reached, a warning signal indicated a fire in one of the three engines. Of course, the engine from which the fire warning signal originated was immediately shut down. The particular engine which was shut down happened to be one of the engines driving one of the two operational electrical generators. Consequently, only one electrical generator remained to supply all of the electrical needs of the aircraft. Shortly after shut down of the engine, all of the electrical power was lost when the last functioning generator tripped off. The navigational instruments and lights became inoperative because of the failure of the electrical power system. The pilot lost spacial orientation in the darkness and cloud cover, and the attitude of the aircraft changed from the upright climb to an inverted, high-speed, steep dive toward the ocean. The aircraft disintegrated and all occupants perished when the aircraft crashed into the ocean. Evidence recovered from the crash site indicated that the wing flaps were in the extended position when the crash occurred. Although some evidence suggested that the flight engineer had attempted to reduce the electrical load after the fire warning, the last remaining generator tripped off within seconds after the previously functioning second generator was cut off when its driving engine was shut down. It could be that the attitude change of the aircraft coupled with the loss of interior lights and the exigencies of the fire warning may have resulted in the failure to manually disconnect nonessential electrical loads, such as the one operating pack fan.

The present invention is addressed to these and other problems, potential problems and potential safety hazards, which heretofore may have not been appreciated or perceived in the light described here, but which nonetheless are present in aircraft of the type in which the pack fans are automatically connected to the electrical system in relation to the extension of the wing flaps. Those skilled in the art may more fully appreciate the significance of the present invention in light of a more complete understanding of the nature and limitations of the type of aircraft to which this invention relates.

SUMMARY OF THE INVENTION

An objective of the present invention is to provide a new and improved system for automatically controlling the priority by which major electrical loads are energized in relation to the number of generators or the electrical power generating capability available in an aircraft. Another objective is to provide a new and improved control system for automatically controlling the priority by which major electrical loads are energized in an aircraft of the type having multiple electrical power generators which are separately driven by individual aircraft propulsion engines and means for automatically energizing major electrical loads in relation to the degree of extension or position of the wing flaps or other wing control surfaces of the aircraft.

Another objective is to provide a new and improved control system for automatically disconnecting pack fans from the electrical load of the aircraft upon the reduction in sufficient electrical generating capacity to safely supply electrical energy necessary to energize the pack fans and all the essential aircraft systems required for safe flight. A further objective of the present invention is to provide a safety system or an aircraft of the type described which automatically deactivates and disconnects each pack fan in relation to the available electrical generating capacity without disabling the complete pack unit, thereby obtaining the benefit of continued short-term operation of the pack unit while the pack fan is disabled due to temporary, uncorrected electrical overloads. Another objective is to provide a new and improved control system which will measurably increase the safety of operation of aircraft of the type in which pack fans are automatically connected as additional electrical load on the electrical supply when the wing flaps or other wing control surfaces are extended to predetermined positions.

Still a further objective is to provide a new and improved test apparatus for use in quickly and conveniently checking operation of the automatic control system in the aircraft, and thereby obtain an increased assurance for generally better reliability and safety of operation of the aircraft. Other objectives and advantages should be apparent to those skilled in the art.

Broadly viewed, the present invention is a system for automatically disconnecting an electrical device from the electrical supply of an aircraft of the type in which an additional electrical device, such as a pack fan, is connected to the electrical supply upon the positoning of a wing control surface of the aircraft in a predetermined position. The automatic disconnecting system of the present invention generally comprises means associated with the wing control surface for supplying a signal upon movement of the wing control surface to a predetermined position, and another means operatively associated with the electrical power generators for supplying a signal representative of the maximum quantity of electrical power available to be supplied. Logic means operatively receives the signals representative of the position of the wing control surface and the maximum quantity of electrical power available and determines if an overload condition may potentially result. Upon the determination of a potentially overloaded condition, the additional electrical load is prevented from being energized as by disconnecting it from the electrical supply bus of the aircraft. In a more specific embodiment, a plurality of wing control positions are determined and the maximum electrical power generating capacity is determined in relation to the number of functioning generators. These determinations are logically interrelated and various electrical loads are disconnected or are energized one at a time to reduce only that amount of electrical load necessary to prevent an overload.

Test apparatus is also provided for checking and assuring proper operation of the control system. The test apparatus may be integrated into the aircraft to allow periodic checks by a flight engineer or the like, or can be separately provided to be mechanically connected to the control system when tests are desired. The test apparatus comprises means for selectively supplying a test input signal simulating and representative of a wing control surface position and means for selectively supplying a test input signal simulating and representative of a quantity of electrical power available. The test apparatus also comprises means for signalling the operation of the logic means of the control system in response to the test input signals supplied.

A more complete description of the scope and details of the present invention and its preferred embodiment are presented in the description of the preferred embodiment, in the drawing and its description, and in the appended claims, all of which follow.

DESCRIPTION OF THE PREFERRED EMBODIMENT

Automatic Control System

Figure 1:
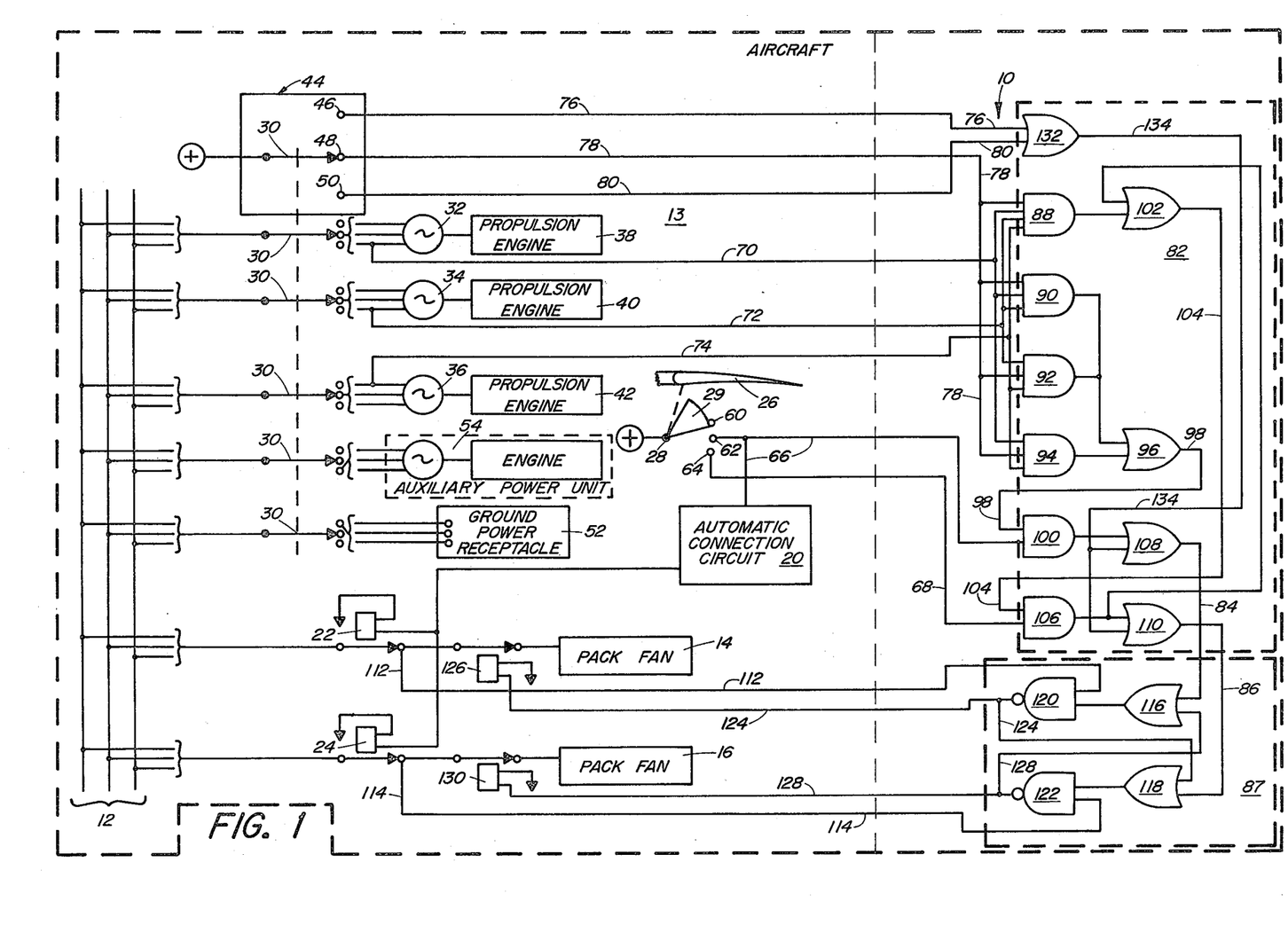
FIG. 1 schematically discloses an electrical circuit diagram embodying the automatic control system of the present invention and the wing control surfaces, electrical generators, pack fans and electrical supply bus of an aircraft of the type to which this invention relates.

Referring now to FIG. 1, there is generally disclosed an inventive system 10 for controlling the electrical load connected to an electrical supply bus 12 within an aircraft represented schematically at 13. As will be described in detail the system 10 operatively disconnects or prevents the energization of first and second pack fans 16 and 18, respectively, after the pack fans 16 and 18 may have beeen automatically connected to the supply bus 12 by an automatic connection circuit 20. The pack fans 14 and 16 cool passenger-compartment pressurizing, heating and air-conditioning units or pack units (not shown), as is known in the art. The automatic connection circuit 20 simultaneously activates relays 22 and 24 which respectively connect the first and second pack fans 14 and 16 to the supply bus 12 in response to the extension of a wing flap 26 or other wing control surface such as a wing slat. An electrical switch 28 is operatively and mechanically connected with the wing flap 26 and provides an electrical signal to the automatic connection circuit 20 upon the wing flap 26 being positioned in one or more of a plurality of predetermined positions of extension from a normal nonretracted position.

The aircraft 13 also includes a major power selection switch 30 which operatively controls the type and source of power which is supplied to the supply bus 12. For convenience the major power selection switch 30 is illustrated in FIG. 1 as having three positions. In the position in which the switch is illustrated, power from first, second and third electrical generators 32, 34 and 36 respectively, is supplied to the bus 12. The generators 32, 34 and 36 are mechanically driven by propulsion engines 38, 40 and 42 of the aircraft. Although not shown, conventional means are provided in conjunction with each generator 32, 34 and 36 to disconnect that generator from the bus 12 if necessary. The power selection switch 30 includes a separate power selection indicator switch 44 having terminals 46, 48 and 50 which receive signals indicative of the condition of the power selection switch 30. A signal is provided at the terminal 48 from the indicator 44 when the power selection switch 30 is positioned to connect the electrical generators 32, 34 and 36 to the supply bus 12. The power selection switch 30 is also positionable to connect a ground power receptacle 52 to the supply bus 12. When the ground power receptacle 52 is connected to the supply bus 12 a signal is supplied at terminal 46 of the indicator switch 44. An auxiliary power unit 54 of the aircraft 13 is also connectable to the supply bus 12 by moving the power selection switch 30 to its third position. A signal is supplied on terminal 50 when the auxiliary power unit 54 is connected to the bus 12. The power selection switch 30 allows only one of the three sources of power to be connected to the supply bus 12 at one time (the three sources being the electrical generators or ground power received from the receptacle 52 or the auxiliary power unit 54).

The system 10 of the present invention is operatively connected with the elements of the aircraft 13 to automatically disconnect one or more of the pack fans 14 or 16 from the electrical supply bus 12. Disconnection of the pack fans 14 or 16 reduces the electrical load which must be supplied with electrical power from the power generating means defined by the electrical generators 32, 34 and 36.

The system 10 includes the switch 28 which provides a signal indicative of the wing flap position. When the wing flap is in the nonretracted position illustrated, a wafer-type blade member 29 of switch 28 is connected to terminal 60. For purposes of the present description, terminal 60 is not electrically connected to the system 10, however in reality it may be utilized in the aircraft in a suitable manner. When the wing flap 26 is extended to a first predetermined position, typically the two degree extended position, the blade 29 of switch 28 provides a positive signal on terminal 62. When the wing flap is positioned in a next sequential predetermined extended position, typically the five degree extended position, the blade 29 of switch 28 contacts both terminals 62 and 64 and provides positive signals on terminals 62 and 64. As the wing flaps are extended even further, the blade 29 maintains contact with both terminals. The signals at terminal 62 and 64 respectively, when the wing flap is positioned in the two degree and five degree extended positions, are supplied over conductors 66 and 68 to the system 10. The automatic connection circuit 20 receives the signals from switch 28 upon extension of the wing flap 26 and closes relays 22 and 24 to automatically and simultaneously energize both pack fans 14 and 16 when the wing flaps are extended. The signals supplied over conductors 66 and 68 are referred to herein as wing surface signals. The wing surface signals are supplied when the switch 28 has determined that the wing flap 26 has attained its various predetermined positions.

Conductors 70, 72 and 74 are respectively connected with the first generator 32, the second generator 34 and the third generator 36 and supply signals representative of the maximum quantity of electrical power supplied by the generators 32, 34 and 36 to the supply bus 12. For convenience, the conductors 70, 72 and 74 are shown connected to an output conductor of generator, however any well-known sensing or signal conditioning circuit may be utilized to obtain positive signals on the conductors 70, 72 and 74 respectively when the generators 32, 34 and 36 are properly functioning. Each generator 32, 34 and 36 possesses a maximum power generating capacity. The signals on conductors 70, 72 and 74, referred to herein as generator signals, collectively define the maximum power generating capability of the generator means connected to the supply bus 12, in accordance with the number and capacity of those generators 32, 34 and 36 which are properly functioning and connected to the bus 12.

Signals from the power indicator switch 44 are supplied to the system 10 over conductors 76, 78 and 80. Positive signals are applied on conductors 76, 78 and 80 respectively when the power selection switch 30 is positioned to connect the ground power receptacle 52 to the bus 12 (connection to terminal 46), to connect the generators 32, 34 and 36 to the bus 12 (connection to terminal 48) and to connect the auxiliary power unit 54 to the bus 12 (connection to terminal 50).

The wing surface signals on conductors 66 and 68, and the generator signals on conductors 70, 72 and 74, and signals indicative of the position of the power selection switch 30 on conductors 76, 78 and 80 are applied to a logic circuit means 82. The logic circuit 82 receives the wing surface and generator and power selection signals and determines if the maximum power generating capacity of the connected and operating electrical generators will be exceeded by connecting one or both of the pack fans 14 and 16 to the supply bus 12 upon the wing flap 26 attaining one or more of its predetermined extended positions. Should the maximum power generating capacity be exceeded, the logic circuit means 82 will supply output signals on conductors 84 and 86 which will operatively be utilized by a switching control circuit means 87 to disconnect or prevent the energization of one or both of the pack fans 14 and 16 and to connect the pack fans 14 and 16 to the supply bus one at a time.

The logic circuit 82 utilizes AND gates 88, 90, 92 and 94 to determine the maximum power generating capacity of the electrical generator means 32, 34 and 36. The signal on conductor 78 from terminal 48 of the indicator switch 44 applies one input to the AND gates 88, 90, 92 and 94 to thereby enable these AND gates when the generators are connected to the supply bus. The signal on conductor 70 from generator 32 is applied as one input to the AND gates 88, 92 and 94. The signal on conductor 72 is applied as one input to the AND gates 88, 90 and 92. The signal on conductor 74 is applied as input to the AND gates 88, 92 and 94. Thus, the output of AND gate 88 goes high when all three generators 32, 34 and 36 are properly functioning and connected to the supply bus 12. A high output is supplied from AND gates 90, 92 and 94 when any two of the three generators are functioning. High outputs are supplied from AND gate 90 when generators 32 and 34 are functioning, from AND gate 92 when generators 34 and 36 are functioning, and from AND gate 94 when generators 32 and 36 are functioning. No output is available from the AND gates 88, 90, 92 and 94 when only one of the electrical generators is functioning.

The output from AND gates 88, 90, 92 and 94 is utilized in conjunction with the signals on conductors 66 and 68. The output signals from AND gates 90, 92 and 94 are applied to OR gate 96. Thus a high output from OR gate 96 on conductor 98 represents proper operation of any two of the three electrical generators. The signal on conductor 98 is applied as one input to AND gate 100. The output from AND gate 88 is applied to the OR gate 102. The OR gate 102 applies a high output on conductor 104 when all three electrical generators are functioning, and this signal is applied as one input to AND gate 106.

The AND gates 100 and 106 operatively determine if sufficient power generating capacity is available to supply the pack fans 14 and 16, as the pack fans are automatically energized by the automatic connection circuit 20 in accordance with the wing flap extension. The signal on conductor 66 represents the automatic energization of the pack fans. A signal on conductor 98 represents that at least two of three electrical generators are functioning. When two of three generators are functioning and the wing flap is positioned in the first or two degree predetermined position, both inputs to AND gate 100 are high and its output is also high. The output from AND gate 100 is coupled through OR gate 108, and a high output is applied on conductor 84. Upon the positioning of the wing flap 26 in the second or five degree predetermined position, a high signal is present on conductor 68 and on conductor 66, since the wafer blade 29 of switch 28 contacts both terminals 62 and 64 when the wing flaps are in the five degree position. If all three generators are functioning a high signal is also present on conductor 104. High signals are thus applied as input to AND gate 106 and its high output is applied to OR gate 110. The OR gate 110 applies a high signal to conductor 86.

It is apparent from the operation of the logic circuit 82 thus described that a signal will be supplied on conductor 84 when at least any two of the three generators are operating and the wing flap is positioned in the first predetermined position. In addition, a high signal is applied on conductor 86 when all three generators are functioning and the wing flaps are positioned in the second predetermined position. However, should one of the three generators fail while the wing flaps are in the second predetermined position, the output from AND gate 88 will go low, as will the signal on conductor 104 from OR gate 102. The output of AND gate 106 will go low, as will the output of OR gate 110 on conductor 86. Should only one generator be functioning when the wing flap is in the first or second position, no high signal will be present on either conductor 98 or 104, and the outputs from OR gates 108 and 110 will both be low.

The switching control circuit means 87 assures that the system 10 will operatively disconnect the one of the pack fans 14 or 16 which has not been previously manually disconnected from the supply bus, when circumstances require that the last operative pack fan be disconnected in accordance with the principles of the invention. The switching control circuit 87 also assures that the pack fans will be split or connected one at a time as the flaps are extended from the first extended position to the next extended sequential position during normal operation of the aircraft.

The switching control circuit 87 receives signals from the logic circuit 82 on conductors 84 and 86 and also receives signals present on conductors 112 and 114 representative of the automatic connection of the pack fans 14 and 16, respectively, to the supply bus 12. It should be noted that the manual disconnection or disablement of one of the pack units will also involve opening a circuit breaker or master switch (not shown) located between the supply bus 12 and the appropriate relay for the pack fan associated with the disabled pack unit. Thus if one of the pack units is disabled, no signal will be present on the conductor 112 or 114 of the associated pack fan 14 or 16, even if the automatic connection circuit 20 closes the relay 22 or 24 connected to the associated pack fan. Conductors 84 and 86 are respectively connected as one input to each of OR gates 116 and 118. Conductors 112 and 114 are respectively connected as one input to each of NAND gates 120 and 122. Conductor 124 conducts the output signal from NAND gate 120 to a normally closed relay 126 and to one input to OR gate 118. Conductor 128 conducts the output signal from NAND gate 122 to a normally closed relay 130 and to one input of OR gate 116. A positive signal is required on each conductor 124 and 128 to open the relays 126 and 130, respectively, thereby disconnecting or disabling each pack fan 14 and 16, respectively.

Under normal conditions, the switching control circuit 87 allows one of the pack fans to be energized when the wing flaps 26 are positioned at the first predetermined extended position (connection of blade 29 to terminal 62) and allows both pack fans to be energized when the wing flaps 26 are positioned in the next sequential extended position (connection of blade 29 to terminal 64). When the wing flaps are extended to the first predetermined position, the automatic connection circuit 20 closes both relays 22 and 24, and high signals are present on both conductors 112 and 114. A high signal will also be present on conductor 84, since two of three generators will be operating. The high signal on conductor 84 causes a high output signal from OR gate 116 to one input of NAND gate 120. The two high inputs to NAND gate 120 cause a low output signal on conductor 124 and relay 126 is not energized and thus remains closed, thereby allowing pack fan 14 to be energized. OR gate 118 simultaneously receives two low inputs and its output is low. The low input to NAND gate 122 from OR gate 118 and the high input to NAND gate 122 from conductor 114 cause a high signal on conductor 128. The high signal on conductor 128 energizes relay 130 and opens the relay 130, thereby preventing the energization of pack fan 16. Thus under normal operation, only one of the two pack fans is turned on when the wing flaps are extended to the first predetermined position. This splitting of the pack fans, or energization one at a time is in distinction to the operation of the usual aircraft circuit 20 which automatically connects both pack fans when the wing flaps are extended to the first predetermined position.

Under normal conditions, when the wing flap 26 is extended to the second predetermined position, and all three electrical generators are functioning, high signals are present on both conductors 84 and 86. The effect of the high signals on conductors 84 and 112 has been previously described. The high signal on conductor 86 is coupled through OR gate 118 and applied as one input to NAND gate 122. The high signal on conductor 114 is applied to the other input of NAND gate 122. A low signal is applied as the output from NAND gate 122 on conductor 128. The low signal on conductor 128 does not energize relay 130, and relay 130 remains closed allowing the pack fan 16 to be energized. Under normal operating conditions, it is apparent that the second pack fan 16, in this example, is energized only upon the wing flaps being extended to the second predetermined position, typically the five degree position. Consequently, as a result of the inventive system 10, the pack fans 14 and 16 are connected one at a time as predetermined sequential extended positions of the wing flaps are attained.

The switching control circuit 87 also operatively disconnects the pack fans 14 and 16 or prevents the energization of these fans 14 and 16. Assume that the wing flaps have been positioned in the second predetermined position and that all three generators were previously operating. Further assume that one of the generators becomes inoperative. Under this condition, the signal on conductor 86 changes from a previously high condition to a low condition. The output from NAND gate 122 goes high energizing relay 130 and preventing the energization of pack fan 16. Pack fan 14 will operate and will continue to operate even as the wing flaps are retracted to the first predetermined position (connection of blade 29 to terminal 62 in switch 28). Pack fan 14 will continue to operate because the high signal remains on conductor 84. If one of the two remaining operative generators becomes inoperative, the high signal on conductor 84 is removed and the high signal on conductor 124 energizes relay 126 to disconnect the last remaining pack fan 14.

In those circumstances where one generator is known to be inoperative and one of the pack fans has been manually disconnected to allow operation of the aircraft under the currently authorized operating procedures, the switching control circuit 87 will operatively energize the one of the two pack fans 14 or 16 which has not been manually disconnected. Under these described conditions, two of the three electrical generators are operating and a high signal is present on conductor 66 when the wing flaps are extended to any position. Consequently, a high signal is present on conductor 84. A high signal is applied as the output from OR gate 116 to the input of NAND gate 120. If pack fan 16 has been manually disconnected, a high signal is present on conductor 112 and the output of NAND gate 120 is low, thereby allowing the pack fan 14 to be energized since relay 126 is not opened. However, if pack fan 14 has been manually disconnected, a low signal is present on conductor 112. The low signal on conductor 112 and the high signal from the output of OR gate 116 cause a high output from NAND gate 120. The high output from NAND gate 120 is coupled to one input of OR gate 118 and the output from OR gate 118 is applied as one input to NAND gate 122. The other input to NAND gate 122 is a high signal present on conductor 114, since pack fan 16 has not been manually disconnected. The output of NAND gate 122 is a low signal which does not energize relay 130 and allows pack fan 116 to be energized. Thus, the switching control circuit 87 selects the one of the pack fans which has not been manually disconnected and energizes that pack fan when the wing flaps are extended to any position. Should one of the last two remaining generators become inoperative, low signals result on both conductors 84 and 86 and both relays 126 and 130 are energized to prevent the connection of the pack fans 14 and 16 to the supply bus 12.

When the power selector switch 30 is positioned so that power is supplied to the bus 12 from either the ground receptacle 52 or the auxiliary power unit 54, signals are present on one of the conductors 76 or 80. These high signals are coupled through OR gate 132 and applied over conductor 134 to both inputs of OR gates 108 and 110. The signals on conductors 84 and 86 are high output signals from OR gates 108 and 110, thus energizing both pack fans 14 or 16. The logic circuit 82 thereby distinguishes between power supplied from the power generating means 32, 34 and 36 driven by the aircraft propulsion engines, and that power supplied by the auxiliary power units 54 and from the ground power receptacle 52.

The wing control signals applied on conductors 66 and 68 are directly correlated with the electrical load added to the supply bus 12 by the connection of each of the pack fans 14 and 16. The pack fans represents predetermined electrical load and the correlation allows for determination of the additional electrical load created by the connection of the pack fans to the supply bus. The generator signal applied on conductors 70, 72 and 74 represents the predetermined maximum power generating capacity of the operating and connected electrical generators. The known relationship between the maximum power generating capacity, dependent on the number of generators functioning, and the electrical load on the system, dependent on connection of the pack fans to the electrical supply, allows for a determination of the maximum amount of electrical load which can safely be supplied by the electrical generators without overloading the generators. As a result of this determination, it may be necessary to automatically disconnect or prevent energization of one or more of the pack fans and thereby avoid the significant potential problem in the art of automatically overloading and consequently disrupting the electrical supply in an aircraft of the type described. This desirable end result may now be obtained, as a result of the present invention.

Test Apparatus

Figure 2:
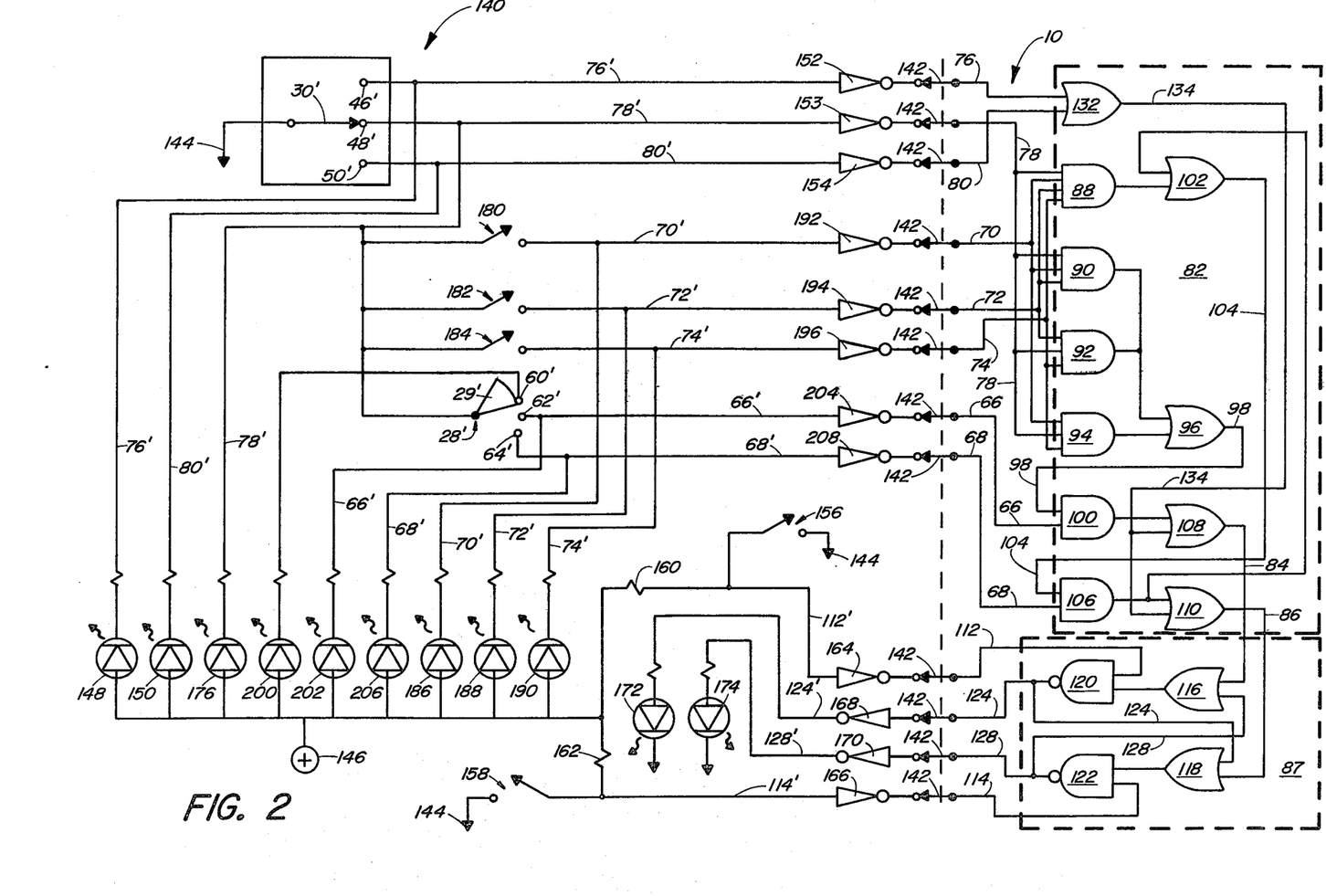
FIG. 2 schematically discloses an electrical circuit diagram embodying the test circuit apparatus of the present invention, which is electrically connected in operative relation with a portion of the automatic control system illustrated in FIG. 1.

A test circuit and apparatus 140 of the present invention is illustrated in FIG. 2 as connected to the control system 10. The function of the test apparatus 140 is to test the control system 10 to assure that the system 10 operates the same as has previously been described in conjunction with FIG. 1. The test apparatus 140 may be integrated into the aircraft along with the control system 10 or the test apparatus 140 may be assembled into a separate test instrument.

The test apparatus 140 is electrically connected to the control system 10 through a test substitution switch means 142. The test switch 142 is of a conventional type which electrically disconnects the elements of the aircraft 14 from the control system 10 and substitutes the elements of the test apparatus 140 for connection to the control system 10. Thus, the test switch 142 allows only the aircraft elements or the test apparatus elements to be connected to the control system. The test switch 142 will typically be integrated into the aircraft whether or not the test apparatus is provided as a separate test instrument.

The test apparatus 140 includes a test major power selector switch 30'. The test selector switch 30' operatively simulates the operation of the major power selector switch 30 (FIG. 1) as has been previously described. Operation of the test selector switch 30 connects one of its test terminals 46', 48' and 50' to the electrical reference or ground 144. The connection of test terminal 46' to ground 144 supplies a low level logic signal on conductor 46', and electrically conducts current from a current source 146 through a light emitting diode (LED) 148 to ground 144. Light is emitted from LED 148 and indicates the selective operation of the test selector switch 30' to a condition representative of connection of the ground power receptacle to the aircraft supply bus. Similarly, operating the test selector switch 30' to connect the terminal 50' to ground 144 causes a ground signal on conductor 80' which causes LED 150 to emit light. LED 150 indicates that the test selector switch 30' has been selectively operated to a position representative of the connection of the auxiliary power unit to the supply bus of the aircraft.

The low level logic signals present on conductors 76' and 80' under different operative conditions of the test selector switch 30' are inverted by inverters 152 and 154. The resulting high level logic signals are supplied over conductors 76 and 80 to the logic means 82 of the control system 10. The high signals on conductors 76 and 80 create the same effect in the logic circuit means 82 and the switching control means 87 as has previously been described, if the circuit elements 82 and 87 are functioning properly. This proper operation involves, as has been previously described, the application of high logic signals as output from OR gates 116 and 118.

Test pack fan switches 156 and 158 are provided in the test apparatus 140 to simulate the selective manual connection or disconnection of the pack fans to the aircraft supply bus, as may be done by the flight engineer. Closure of switch 156 represents the connection of the first pack fan 14 (FIG. 1) to the supply bus, and closure of switch 158 represents the connection of the second pack fan 16 (FIG. 1) to the supply bus. Closure of the switches 156 and 158 respectively connects the power supply 146 through resistors 160 and 162 to ground 144, and respectively results in the application of low level logic signals on conductors 112' and 114'. Inverters 164 and 166 respectively supply high level signals on conductors 112 and 114 for use by the switching control circuit means 87 in the manner previously described, if the switching control circuit means 87 is operating properly.

Upon closure of the test pack fan switches 156 and 158, high signals are respectively present on conductors 112 and 114. NAND gates 120 and 122 receive two high level signals as inputs, assuming high output signals are supplied by OR gates 116 and 118 as would be the case upon connection of switch 30' to either of terminals 46' or 50'. The switching control circuit 87 supplies low output signals on conductors 124 and 128. Inverters 168 and 170 supply high output signals on conductors 124' and 128', respectively, and LED 172 and LED 174 are energized to emit light. The energized LED 172 and LED 174 respectively indicate and represent the operation or connection of the first pack fan and the second pack fan to the aircraft supply bus.

It can be seen, therefore, that low logic signals supplied one at a time on conductors 76' and 78' will energize LED 148 and LED 150, respectively, to indicate that the test selector switch 30' has been connected to simulate the connection of the ground power receptacle or the auxiliary power unit, respectively, to the aircraft supply bus. If both test pack fan switches 156 and 158 have been closed, both LED 172 and LED 174 will emit light representing the connection of both pack fans to the supply bus. Thus, the test circuit 140 allows the control system 10 to be tested to determine if both pack fans can be energized when the major power selection switch is connected to either the ground power receptacle or the auxiliary power unit, in accordance with the usual and desired operation.

Operation of the test selection switch 30' to connect its test terminal 48' to ground 144 represents the condition in which the aircraft generators are connected to supply power to the aircraft supply bus. Grounding terminal 48' through the test selector switch 30' supplies a ground or low level logic signal on conductor 78'. LED 176 is lighted indicating that the test selector switch has simulated the connection of the aircraft generators to the supply bus. Inverter 178 supplies a high level logic signal on conductor 78 to enable the AND gates 88, 90, 92 and 94 in the same manner that the major power selection switch 30 (FIG. 1) enables the same AND gates. The ground level signal on conductor 78' is also supplied to test generator switches 180, 182 and 184. The respective closure of the test generator switches 180, 182 and 184 simulates the connection and proper operation of the first aircraft generator, the second aircraft generator and the third aircraft generator to the aircraft supply bus. Closure of switches 180, 182 and 184 supplies the ground level signal on conductor 70', 72' and 74' respectively. LED 186, LED 188 and LED 190 are energized and emit light indicating the operation of the first, second and third generators, respectively. The low level signals present on conductors 70', 72' and 74' are inverted by inverters 192, 194 and 196, respectively, and high level signals are supplied on conductors 70, 72 and 74. The test generator switches 180, 182 and 184 and the inverters 192, 194 and 196 are one example of test circuit means for supplying a test generator signal to the logic circuit 82 of the control system 10. The test generator signal represents and simulates the maximum power generating capability of one or more selected aircraft generators. The signals received on conductors 70, 72 and 74 create the same effect in the logic circuit means 82 as the generator signal supplied by the aircraft generators as has previously been described in conjunction with FIG. 1.

The low level signal on conductor 78' of the test circuit is also supplied to a blade member 29' of a test wing surface switch 28'. Operation of the test switch 28' simulates the extension of the wing control surface of the aircraft. The switch 28' simulates a non-extended position of the wing control surface when the blade member 29' contacts only terminal 60'. The ground level signal on conductor 78' is supplied over conductor 198 to energize LED 200. The light emitted from LED 200 indicates that switch 28' has been operated to simulate a non-extended position of the wing control surface.

Selective movement of the blade member 29' to electrically contact terminal 62' simulates the extension of the wing control surface to the first predetermined position, typically the two degree extended position. A low level electrical signal is conducted over conductor 66' as well as conductor 198. LED 202 is energized and indicates the extension of the wing control surface to the first extended position. The low logic level signal on conductor 66' is inverted by inverter 204 and supplied over conductor 66 to the logic circuit means 82. In a similar manner, selective operation of the switch 28' to position the blade member 29' in electrical contact with terminal 64' also supplies a low level signal on conductor 68'. LED 204 is lighted to indicate the extension of the wing control surface to the second predetermined extended position, typically the five degree position. The low level signal on conductor 68' is also inverted by inverter 206 and is supplied on conductor 68 to the logic circuit means 82. The switch 28' and inverters 204 and 208 are one example of test circuit means for supplying a test wing surface signal to the logic circuit 82 of the control system. The test wing surface signal represents and simulates the selective movement and extension of the wing control surface of the aircraft to one or more selected positions.

It is apparent from the foregoing description of the test circuit 140, that the manual operation of the test selector switch 30', the test generator switches 180, 182 and 184, the test wing control surface switch 28' and the test pack fan switches 156 and 158 supply all of the test input signals to the control system 10 necessary to manually test every facet of operation of the control system. The LED's 148, 150, 176, 186, 188, 190, 200, 202 and 206 represent and indicate the condition of the type of various test input signals supplied to the logic circuit means 82. LED 172 and LED 174 signal the operation of the pack fans of the aircraft. All of the various conditions of operation of the aircraft elements previously described can be simulated by the test apparatus 140, and the signals supplied by LED 172 and LED 174 can be utilized in each instance to determine proper operation of the control system 10.

The preferred embodiment of the present invention has been shown and described with a degree of particularity. It should be understood that the specificity of the present disclosure has been made by way of example and that changes may be made without departing from the scope of the invention.

What I claim is:

1. In an aircraft of the type comprising electrical power generating means connected to supply electrical power to an electrical supply bus within said aircraft and means for automatically connecting another electrical device of predetermined electrical load to said electrical supply bus in addition to other electrical devices previously connected to said supply bus upon positioning of a wing control surface of said aircraft in a predetermined position, an inventive system for automatically operatively disconnecting said additional electrical device from said electrical supply bus, comprising in combination:

first means operatively associated with said wing control surface for supplying a signal indicative of said wing control surface attaining said predetermined position, said signal supplied by said first means defining a wing surface signal;

second means operatively associated with said electrical power generating means for supplying a signal representative of the maximum capability of said power generating means for supplying electrical power to said supply bus, said signal supplied by said second means defining a generator signal;

logic means connected to receive the wing surface and generator signals respectively from said first and second means and for supplying a disconnect signal upon the wing control and generator signals attaining a predetermined relationship; and switching control means operatively connected with said additional electrical device and said logic means and operative upon receipt of the disconnect signal for disconnecting said additional electrical device from said electrical supply bus.

2. An invention as defined in claim 1 wherein the predetermined relationship of the wing control and generator signals upon which said logic means delivers the disconnect signal defines a condition wherein the total resulting electrical load created by automatic connection of said additional electrical device to said supply bus exceeds that electrical load which said power generating means can supply without exceeding the power generating capability of said power generating means.

3. An invention as defined in claim 1 wherein said electrical power generating means comprises a plurality of separate electrical power generators each of which possesses a finite power generating capability, and the generator signal from said second means is representative of the number of electrical power generators connected to supply power to said supply bus.

4. An invention as defined in claim 3 wherein the generator signal from said second means comprises a plurality of separate signals, and said second means supplies a separate generator signal representing each generator connected to supply power to said supply bus.

5. An invention as defined in claims 1 or 4 wherein said aircraft is of the type having a plurality of additional electrical devices each of which presents a predetermined maximum electrical load, and said wing control surface is selectively positionable in a plurality of sequentially related and different predetermined positions, and said connecting means automatically connects a plurality of said additional electrical devices to said electrical supply bus upon positioning of said wing control surface at one predetermined position of a plurality of predetermined positions; and wherein:

said first means supplies a wing surface signal representing at least two predetermined positions at which said wing control surface may be positioned;

said switching control means is operatively connected with each additional electrical device for individually disconnecting each additional electrical device from said supply bus upon receipt of an individual disconnect signal; and said logic means is adapted to supply a plurality of individual disconnect signals to said switching control means.

6. An invention as defined in claim 5 wherein:

the wing surface signal from said first means represents the number of predetermined positions which said wing control surface is positioned from an initial position, the generator signal from said second means indicates the number of properly operating electrical generators, and said logic means supplies an individual disconnect signal to said switching control means when the number represented by the wing signal becomes equal to the number represented by generator signal.

7. In an aircraft of the type comprising a plurality of separate electrical power generators connected to supply electrical power to an electrical supply bus and means for automatically connecting another electrical device of predetermined maximum electrical load to said electrical supply bus in addition to other electrical devices previously connected to said supply bus upon positioning of a wing control surface of said aircraft in a predetermined position, an inventive system for automatically disconnecting said additional electrical device from said electrical supply bus, comprising:

first means operatively associated with said wing control surface for supplying a signal indicative of said wing control surface attaining said predetermined position, said signal supplied by said first means defining a wing surface signal;

second means operatively associated with said plurality of generators for supplying a signal representative of the maximum capacity of electrical power capable of being supplied by the ones of said plurality of separate electrical power generators which are properly functioning, said signal supplied by said second means defining a generator signal;

logic means connected to receive the wing surface and generator signals respectively from said first and second means and for supplying a disconnect signal upon the wing control and generator signals attaining a predetermined relationship, said predetermined relationship of said generator and wing control signals being representative of a condition in which the electrical load on said electrical supply bus exceeds that electrical load which the plurality of functioning electrical generators can supply without exceeding the maximum capacity of any one of said functioning electrical generators; and switching control means operatively connected with said additional electrical device and said logic means and operative upon receipt of the disconnect signal for disconnecting said additional electrical device from said electrical supply bus.

8. An invention as defined in claim 7 wherein:

the plurality of said electrical generators of said aircraft is at least three;

said aircraft includes a plurality of at least two said additional electrical devices;

said wing control surface is selectively positionable in at least two predetermined positions, the first predetermined position being less extended than the second predetermined position;

said connecting means automatically connects two of said electrical devices to said electrical supply bus upon the wing control surface attaining the first predetermined position; and said switching control means is operatively connected with each additional electrical device for individually disconnecting each additional electrical device independently of the other additional electrical device.

9. An invention as defined in claim 8 wherein:
said logic means supplies a disconnect signal to said switching control means upon the wing control surface occupying the second predetermined position and upon said generator signal indicating that less than three generators are properly functioning.

10. An invention as defined in claim 9 wherein:
said logic means supplies a disconnect signal to said switching control means upon said wing control surface occupying the first predetermined position and upon the generator signal indicating that less than two of said power generators are properly functioning.

11. A process for avoiding an electrical generator overload in an aircraft of the type comprising a plurality of separate electrical power generators, each of which is selectively connectable to supply electrical power to an electrical supply bus in said aircraft, and further comprising means for automatically connecting at least one electrical device to the supply bus upon positioning of a wing control surface of said aircraft into at least one of a predetermined number of positions, each electrical device defining a predetermined electrical load, said process comprising the steps of:
determining when said wing control surface attains the one predetermined position,
determining the maximum electrical power generating capacity of the electrical generators properly operating and connected to the supply bus,
determining if the maximum electrical power generating capacity of the connected and operating electrical generators will be exceeded by connecting the electrical device to the supply bus upon the wing control surface attaining the one predetermined position,
preventing the one electrical device from receiving electrical power from the supply bus upon the wing control surface attaining the one predetermined position if the connection of the one electrical device to said supply bus would result in an electrical load greater than that which can be supplied by the maximum electrical power generating capacity of the connected and operating electrical generators, and
energizing the one electrical device upon the wing control surface attaining the one predetermined position if the electrical load of the supply bus after connection of said electrical device does not exceed the maximum electrical power generating capacity of said connected and properly operating electrical generators.

12. A process for energizing selected ones of a plurality of electrical load devices in an aircraft of the type comprising a plurality of separate electrical power generators each of which is selectively connectable to supply electrical power to an electrical supply bus in said aircraft, and means for automatically connecting all of said electrical devices to said supply bus upon positioning of a wing control surface of said aircraft into at least one of a predetermined number of extended positions, each electrical device defining a predetermined electrical load, said process comprising the steps of:
energizing one electrical device upon the wing control surface attaining the one predetermined position if the electrical load of the supply bus after connection of said electrical device does not exceed the maximum electrical power generating capacity of the connected and properly operating electrical generators,
energizing at least one additional other electrical device upon the wing control surface attaining at least one other predetermined position if the electrical load of the supply bus after connection of said other electrical device does not exceed the maximum power generating capacity of said connected and properly operating electrical generators, and
preventing the energization of each electrical device upon the wing control surface attaining any one of the predetermined positions if the connection of the any one electrical device to said supply bus would result in an electrical load greater than that which can be supplied by the maximum electrical power generating capacity of the connected and operating electrical generators.

13. An invention as defined in claims 11 or 12 wherein the aircraft is of a type in which each electrical device comprises an electrical means associated with a passenger compartment heating and air-conditioning unit.

14. An invention as defined in claim 13 wherein said electrical means comprises a fan motor.

15. An invention as defined in claim 3 wherein said wing control surface comprises one of a wing flap or wing slat, and the predetermined position of said wing control surface is an extended position.

16. An invention as defined in claims 1 or 7 further comprising in combination therewith test apparatus, said test apparatus comprising:
first test means for supplying a test signal simulating said wing control surface attaining a selected predetermined position, the test signal supplied by said first test means also defining the wing surface signal;
second test means for supplying a test signal simulating of a selected maximum capacity of electrical power capable of being supplied to the electrical supply bus, the test signal supplied by said second test means also defining a generator signal;
electrical device signal means for supplying a first indication simulating the connection of said additional electrical device to said electrical supply bus and for supplying a second indication simulating the non-connection of said additional electrical device to said electrical supply bus, said signal means being operative to supply one of the first or second indications upon receipt of the disconnect signal; and
test substitution means for connecting said first test means and said second test means to said logic means in place of and in substitution for said first means and said second means, said test substitution means also connecting said electrical device signal means to said switching control means in place of and in substitution for said additional electrical device.

17. An invention as defined in claim 16 wherein:
the test signal supplied by said second test means is representative of a number of electrical power generators whose proper operation is to be simulated, and the generator signal is formed by a plurality of separate signals and each separate signal represents the proper operation of one electrical generator.

18. An invention as defined in claim 17 wherein:
said electrical device signal means supplies a first and a second indication simulating connection and non-connection, respectively, of each one of a plurality of additional load devices to said supply bus.

19. An invention as defined in claim 18 wherein:
the test signal supplied by said first test means is representative of a predetermined number of extended wing control surface positions, and the wing surface signal is formed by a plurality of separate signals and each separate signal represents a different position of a wing control surface.

20. An invention as defined in claim 19 wherein said test apparatus further comprises:
generator signal means operatively connected to receive each of the separate signals defining the generator signal, said generator signal means supplying a separate indication representative of each of the plurality of electrical generators whose proper operation is to be simulated; and
control surface signal means operatively connected to receive each of the separate signals defining the wing surface signal, said control surface signal means supplying a separate indication representative of each of a plurality of positions in which the wing control surface may be positioned.

21. An invention as defined in claims 1 or 7 wherein the aircraft is of a type in which each additional electrical device comprises an electrical means associated with a passenger compartment heating and air-conditioning unit.

22. An invention as defined in claim 21 wherein said electrical means comprises a fan motor.

* * * * *